United States Patent
Carminati et al.

(10) Patent No.: US 11,608,738 B2
(45) Date of Patent: Mar. 21, 2023

(54) ELECTRO-ACOUSTIC TRANSDUCER

(71) Applicant: ENI S.P.A., Rome (IT)

(72) Inventors: Stefano Carminati, San Donato Milanese (IT); Massimo Zampato, Venice (IT); Stefano Mauro, Turin (IT); Renato Galluzzi, San Benigno Canavese (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/441,559

(22) PCT Filed: Mar. 19, 2020

(86) PCT No.: PCT/IB2020/052527
§ 371 (c)(1),
(2) Date: Sep. 21, 2021

(87) PCT Pub. No.: WO2020/194143
PCT Pub. Date: Oct. 1, 2020

(65) Prior Publication Data
US 2022/0170364 A1     Jun. 2, 2022

(30) Foreign Application Priority Data
Mar. 22, 2019  (IT) .......................... 102019000004215

(51) Int. Cl.
*E21B 47/24* (2012.01)
*E21B 47/18* (2012.01)

(52) U.S. Cl.
CPC .............. *E21B 47/24* (2020.05); *E21B 47/18* (2013.01)

(58) Field of Classification Search
CPC .......... E21B 47/14; E21B 47/18; E21B 47/20; E21B 47/22; E21B 47/24
See application file for complete search history.

(56) References Cited

U.S. PATENT DOCUMENTS

| | | | |
|---|---|---|---|
| 5,247,490 A | | 9/1993 | Goepel et al. |
| 5,283,768 A | * | 2/1994 | Rorden ................. E21B 47/16 340/856.4 |

(Continued)

OTHER PUBLICATIONS

International Search Report dated Jun. 23, 2020 re: Application No. PCT/IB2020/052527, pp. 1-4, citing: US 2012/051188 A1, U.S. Pat. No. 5,283,768 A, U.S. Pat. No. 5,615,172 A, U.S. Pat. No. 5,459,697 A and US 2016/3268696 A1.

(Continued)

*Primary Examiner* — Franklin D Balseca
(74) *Attorney, Agent, or Firm* — Cantor Colburn LLP

(57) ABSTRACT

An electro-acoustic transducer includes a tubular body extending a longitudinal direction and having two end portions, opposing each other longitudinally, and internally having a first chamber, sending with the first end portion and a second chamber, on one side adjacent to and in fluidic communication with the first chamber and on the other side ending with the second end portion. The first end portion is closed towards the outside by a membrane applied to the tubular body. The second end portion has openings that put it in fluidic communication to the outside of the tubular body. The first chamber containing electrical windings arranged in succession to each other in the longitudinal direction. The second chamber is filled with a liquid. A movable element is housed in the first chamber and has a permanent magnets packaged and arranged one above the other, with the magnetization alternating and separated.

9 Claims, 4 Drawing Sheets

(56) References Cited

U.S. PATENT DOCUMENTS

| | | | |
|---|---|---|---|
| 5,459,697 A | 10/1995 | Chin et al. | |
| 5,615,172 A | 3/1997 | Kotlyar | |
| 7,936,641 B2 * | 5/2011 | Rapp | G01V 1/133 |
| | | | 367/145 |
| 8,258,975 B2 * | 9/2012 | Tinnen | E21B 47/18 |
| | | | 340/854.3 |
| 2012/0051188 A1 | 3/2012 | Graber | |
| 2016/0146001 A1 | 5/2016 | Chu | |
| 2016/0326869 A1 | 11/2016 | Duong | |
| 2017/0167252 A1 | 6/2017 | Pratt et al. | |

OTHER PUBLICATIONS

Written Opinion dated Jun. 23, 2020 re: Application No. PCT/IB2020/052527, pp. 1-6, citing: US 2012/051188 A1, U.S. Pat. No. 5,283,768 A, U.S. Pat. No. 5,615,172 A, U.S. Pat. No. 5,459,697 A and US 2016/3268696 A1.

* cited by examiner

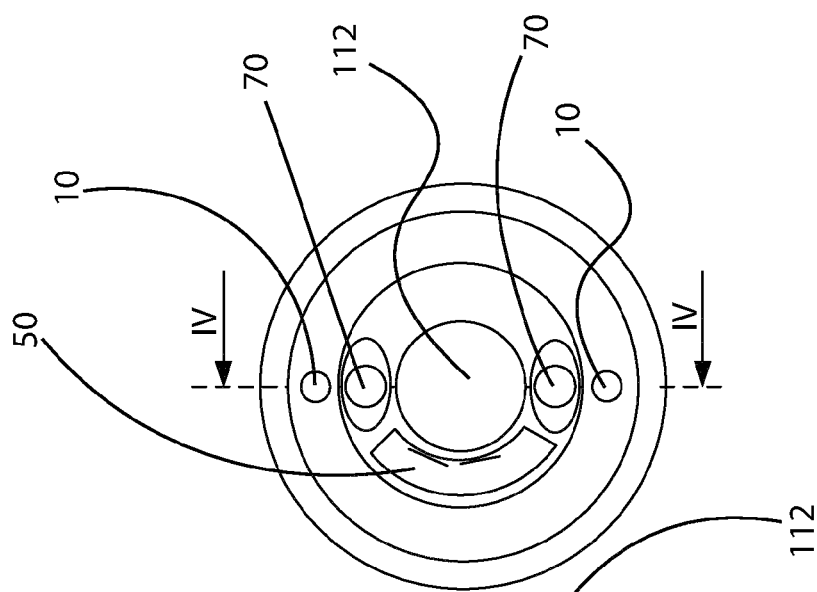
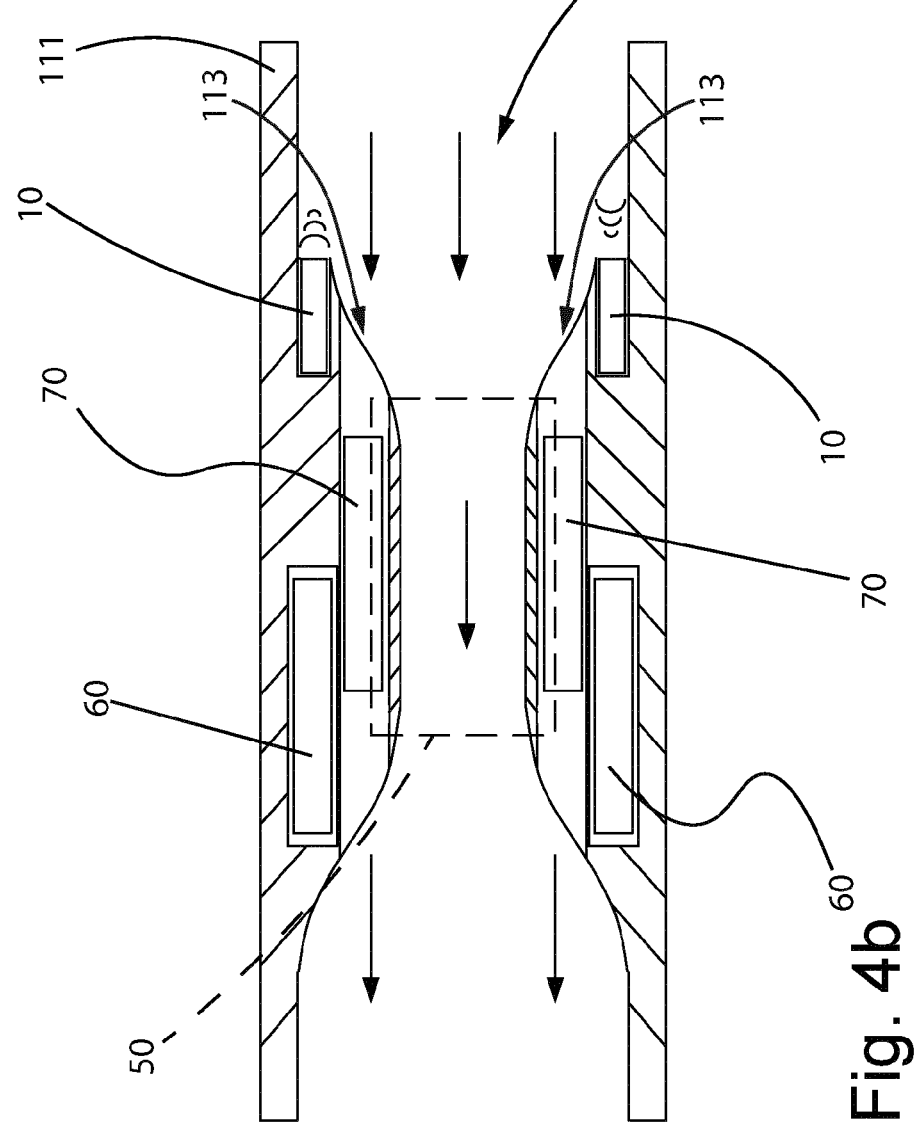

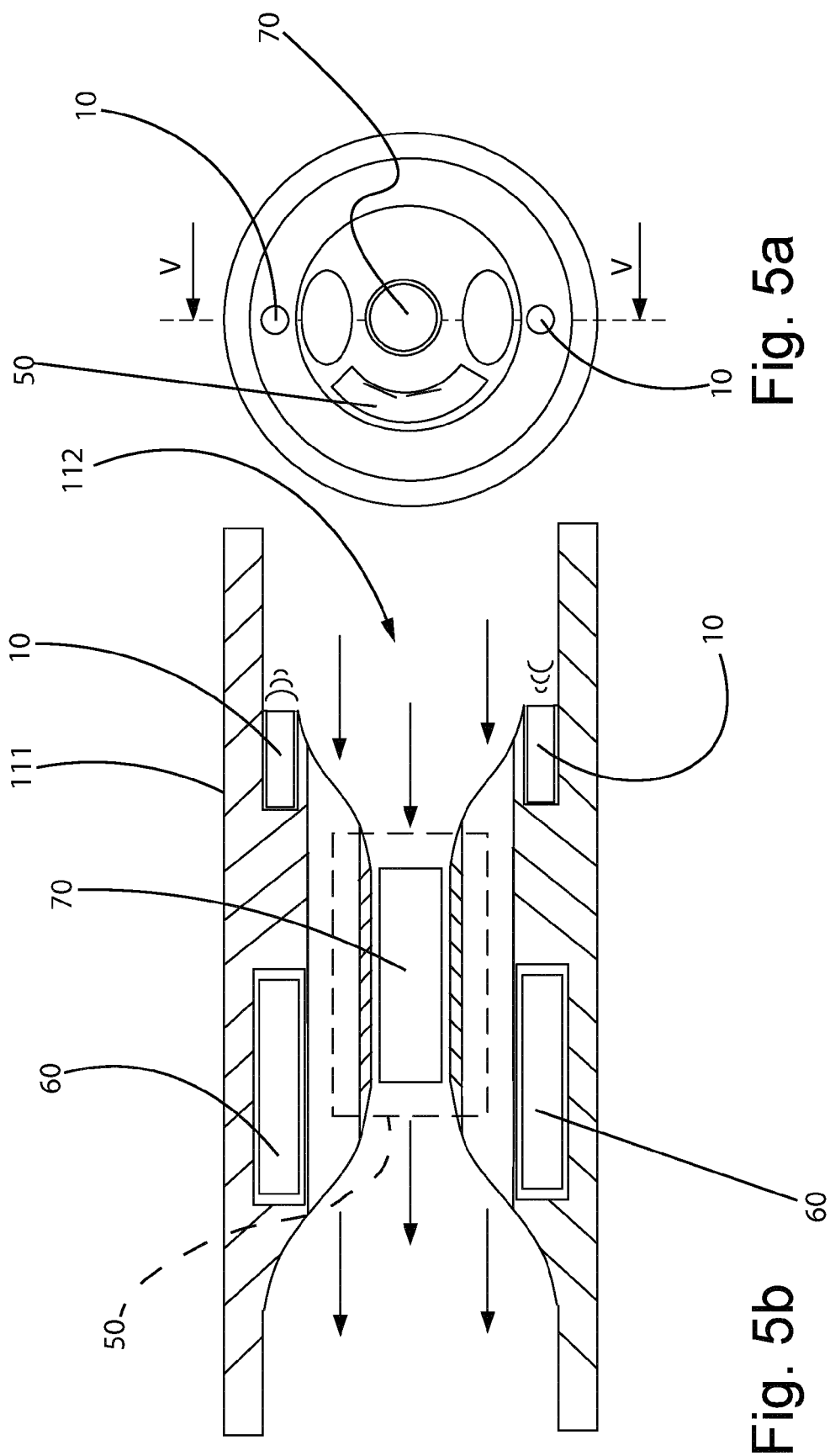

ELECTRO-ACOUSTIC TRANSDUCER

TECHNICAL FIELD

The present disclosure relates to an electro-acoustic transducer particularly but not exclusively usable in the oil sector.

BACKGROUND

Drilling of oil wells increasingly requires control of operations to minimize costs, times and risks. This has translated into an increase in the number of instrumentations present on the head of the drilling battery (drillpipes and drillbit), the so-called bottom hole assembly, so as to accommodate, in addition to the typical instrumentation for monitoring the drilling parameters (Measure While Drilling—MWD), also instrumentations for the formation assessment, which operation was carried out in the past when the drilling was stopped with dedicated instruments lowered into the well with a cable (tool wireline).

In order to monitor the drilling progress and the state of the well in production, the use of geophysical analysis techniques based on the interpretation of the signal deriving from the reflection of acoustic waves and of techniques for the transmission of measurement data to the surface through the drilling mud has long been known in the oil industry. For geophysical analysis, the numerous technical solutions for the emission of seismic waves include hydraulic actuators that move a piston through hydraulic lines controlled by servo-valves. An example of a transducer device according to the prior art is provided in U.S. Pat. No. 4,702,343 which describes a device for generating seismic waves for geological investigations.

For telemetry applications, the emission of acoustic waves provides for voice coil type actuators. Such devices are generally capable of generating pressure waves by modulating the flow of the drilling mud through servo-valves.

US20160146001A1 describes a so-called voice coil device for operating a movable element which determines the opening and closing of a valve.

US20170167252A1 illustrates an actuator for a telemetry device of the mud pulser type which comprises a solenoid servo-valve.

For both applications, these devices are characterized by relatively large dimensions and the frequency band in which they operate is limited by the response times of the present servo-valves. Furthermore, these devices generally have sufficiently high energy consumption that requires the connection to an electrical power supply system which increases the installation complexity at high depths; finally, the above devices are not designed to operate at the high pressures that are typical of the working area at the well bottom.

U.S. Pat. No. 5,247,490A describes an acoustic-optical sensor which is pressure compensated to operate in high pressure environments such as the seabed.

In any case, the increase in instrumentations and the rate of penetration leads to an increase in the demand for the amount of data transferred (monodirectional transmission from the well bottom to the surface) or exchanged (bidirectional transmission between the well bottom and surface) in the unit of time to monitor the drilling progress.

Various systems are currently known for the bidirectional transmission to and from the well bottom, more particularly from and to the equipment of the well bottom, hereinafter called "downhole tools". Current systems are mainly based on the transmission of acoustic or elastic signals or of electrical or electromagnetic signals.

As far as the transmission of acoustic signals is concerned, the "mud-pulser" technology is known, which is based on the transmission of pressure pulses through the drilling fluid present in the well during all drilling operations.

The use of the propagation of elastic waves in the metal of the drillpipes that make up the drilling battery is also known.

As far as the transmission of electromagnetic signals is concerned, a so-called "wired pipe" technology is known, in which the signals are transmitted through electrical conductors inserted in the drillpipes.

A wireless telemetry technology is also known in which electromagnetic signals are transmitted through the drilling fluid by using repeaters along the drilling battery to transport the signal to/from the surface or through the soil involved in the drilling.

Each of these technologies has some drawbacks.

The "mud-pulser" technology, in fact, has frequency, thus transmission speed, and reliability limits since it may be necessary to transmit the same signal several times before receiving it correctly. The transmission capacity of this technology depends on the characteristics of the drilling fluid and the flow rate of this fluid.

The "wired pipe" technology involves very high costs as the wired drillpipes are very expensive; moreover, like in the "mud pulser" technology, whenever it is necessary to add a drillpipe to the drilling string, the wired connection is interrupted thus impeding communication to and from the well bottom during these operations.

The technology based on the transmission of elastic waves in the metal of the drillstring involves potential errors in the transmission due to the operating noise of the chisel or to the deviation of the wells from verticality.

The technology based on the electromagnetic transmission through the soil, due to the low frequencies used to cover transmission distances in the order of kilometers, involves a very low transmission speed (equivalent to that of "mud pulser" technology) and problems of reliability due to the crossing of several formation layers with different electromagnetic propagation characteristics.

SUMMARY

The present disclosure provides an electro-acoustic transducer with reduced dimensions and capable of operating in a wider frequency range than the prior art.

The present disclosure also provides a bidirectional data transmission system in a well for the extraction of formation fluids which is simple, reliable and inexpensive.

This and other advantages according to the present disclosure are achieved by providing an electro-acoustic transducer as described in claim 1 and by a bidirectional data transmission system as shown in claim 7.

Further characteristics of the electro-acoustic transducer and of the bidirectional data transmission system are the subject of the dependent claims.

BRIEF DESCRIPTION OF THE DRAWINGS

The features and advantages of an electro-acoustic transducer and of a bidirectional data transmission system according to the present disclosure will be more apparent from the following description, which is to be understood as exemplifying and not limiting, with reference to the schematic attached drawings, wherein:

FIG. 1b is a view of a detail of the transducer of FIG. 1a;

FIG. 4a is a schematic top view of a first embodiment of a drillpipe of the rig of FIG. 3 which is part of the bidirectional data transmission system;

FIG. 4b is a schematic section view along the line IV-IV of the drillpipe of FIG. 4a;

FIG. 5a is a schematic top view of a second embodiment of a drillpipe of the rig of FIG. 3 which is part of the bidirectional data transmission system; and FIG. 5b is a schematic section view along the line V-V of the drillpipe of FIG. 5a.

DETAILED DESCRIPTION OF THE DRAWINGS

Figure 1A:
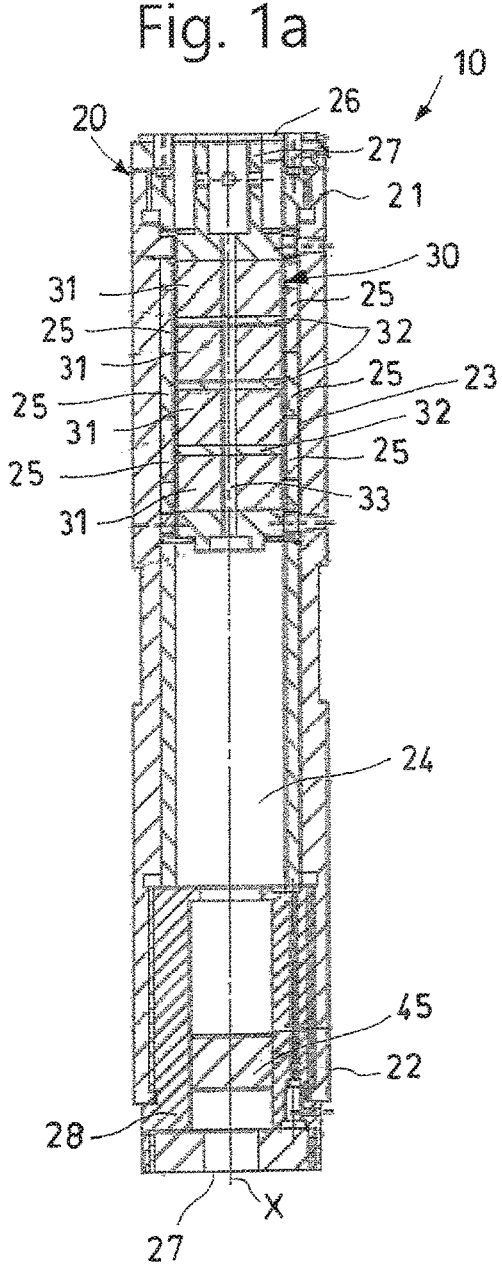
FIG. 1a is a section view of an electro-acoustic transducer according to the present disclosure.

With reference to the figures, an electro-acoustic transducer is shown, indicated overall with number 10. This electro-acoustic transducer 10 is in particular intended to be in contact with a pressurized fluid through which acoustic signals are received or transmitted. Furthermore, the electro-acoustic transducer 10 is designed to operate as a transmitter or receiver of acoustic waves in the 450-5000 Hz frequency range, preferably in the 500-3000 Hz frequency range.

The electro-acoustic transducer 10 is axial-symmetrical and comprises a main tubular body 20 preferably of a cylindrical shape and preferably of ferromagnetic material which extends in length along a longitudinal direction X; this main tubular body 20 comprises a first end portion 21 and a second end portion 22 opposite to each other longitudinally.

Furthermore, the main tubular body 20 internally has a first chamber 23 which ends with the first end portion 21 and a second chamber 24 on one side adjacent to and in fluidic communication with the first chamber 23 and on the other side ending with the second portion end 22.

The compartment defined internally by the chambers 23, 24 can be of any preferably cylindrical shape.

The first end portion 21 is closed towards the outside by means of a membrane 26 applied to the main tubular body 20.

Said membrane 26 is preferably made of harmonic steel.

The second end portion 22 has one or more openings 27 which put it in fluidic communication to the outside of the main tubular body 20.

The first chamber 23 contains in its walls a plurality of electric windings 25 arranged in succession to each other in the longitudinal direction X.

The electric windings 25 are preferably made by means of metallic rings, preferably of copper separated by an insulating layer, for example an insulating film. This embodiment of the electric windings 25 is particularly advantageous for using the electro-acoustic transducer as an acoustic signal transmitter.

The electro-acoustic transducer 10 also comprises a movable element 30 housed in the first chamber 23; this movable element 30 advantageously comprises a plurality of permanent magnets 31, preferably but not necessarily cylindrical, packaged one above the other. In particular, the permanent magnets 31 are arranged with the magnetisation alternating in the longitudinal direction X, are stacked and separated from one another by discs 32 of ferromagnetic material and held together by a pin 33 which crosses them for example centrally as shown in FIG. 1.

The permanent magnets 31 are preferably made of Samarium-Cobalt.

Figure 1B:
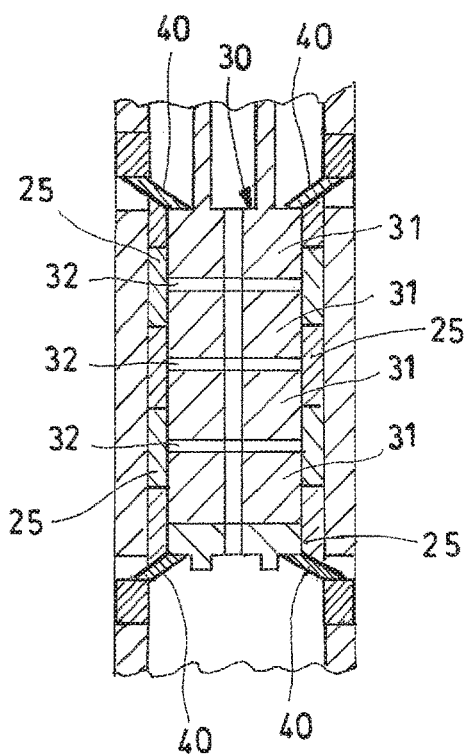
Figure 2:
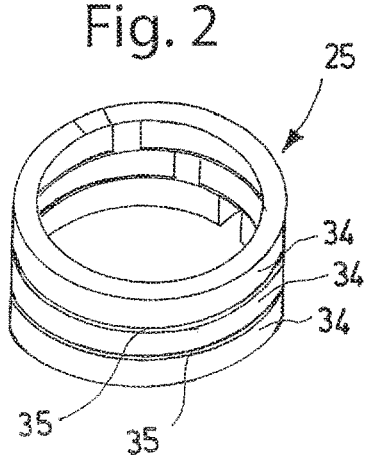
FIG. 2 is a schematic perspective view of an electrical winding present in the electro-acoustic transducer of FIG. 1.

The movable element 31 is supported at the longitudinal ends by springs 40, preferably by a pair of preloaded disc springs 40 as illustrated in FIG. 1. Each of these springs 40 is constrained on one side to the movable element 31 and on the other side to the internal walls of the first chamber 23.

The movable element 30 is also advantageously connected to the membrane 26, preferably by means of an extension element 27 coupled on one side to an end of the movable element 30 and on the other side, to the membrane 26.

The electro-acoustic transducer 10 further comprises a movable piston 45 positioned in the second end portion 22.

The second end portion 22 is preferably coupled to a bushing 28 that extends toward the interior of the second chamber 24 for a section of its length in such a way that it restricts the inner passage. In this case the movable piston 45 is positioned in the narrow inner passage.

The second chamber 24 is filled with a liquid, preferably oil.

When the electric windings 25 are electrically powered with a signal to be transmitted, the interaction between the variable magnetic field generated by the electric windings 25 and the permanent magnets 31 of the movable element 30 induces an oscillating translation of the movable element 30 which acts on the membrane 26 causing it to vibrate and thus causing acoustic waves in the fluid surrounding the electro-acoustic transducer 10 in contact with the membrane 26 itself. The displacements of the movable element 31 cause a pressure variation inside the second chamber 24. These pressure variations are compensated by the movement of the movable piston 45 which is free to move according to the pressure difference that can temporarily occur between the environment outside the electro-acoustic transducer and the second chamber 24. The movable piston 45 in fact reduces or increases the volume of the second chamber 24 in which oil is contained, thus obtaining the static pressure compensation.

This pressure compensation achieved by the piston advantageously allows using the electro-acoustic transducer 10 in critical environments at high pressures up to about 700 bar.

The movable piston 45 and the second chamber 24 are sized to allow pressure compensation when acoustic signals are transmitted and received in the entire frequency range specified above, i.e. 450-5000 Hz, preferably 500-3000 Hz.

In particular, the second chamber 24 is sized in such a way that the system composed of the movable element 30, the liquid contained inside the second chamber 24 and the movable piston 45, has an overall dynamic behaviour such as to guarantee the balance of the internal and external pressure, keeping the difference between the two pressure values close to zero outside the entire 450-5000 Hz frequency range against a peak-to-peak displacement of the movable element 30 by a few tens of micrometers.

This behaviour is determined by the transfer function which is determined between the displacement of the movable element 30 and the pressure difference between the inside and outside of the electro-acoustic transducer 10. The transfer function depends on the volume of the second chamber 24, on the section of the same chamber, on the mass and diameter of the movable piston 45 and on the elastic modulus of the liquid that fills the second chamber 24, normally referred to as the bulk module.

The length of the second chamber 24 is determined as a function of the internal section of the electro-acoustic transducer 10 i.e. the internal section of the first chamber 23, as a function of the mass, of the diameter of the movable piston 45 and of the bulk module of the liquid that fills the second chamber 24. Since this latter parameter varies as a result of the type of liquid used, the pressure and the temperature, the sizing must be developed considering the most critical expected conditions. The sizing is carried out on the basis of a dynamic model of the system described by the following equations:

$$m_p \ddot{x} + \beta_p \dot{x} + \beta_m \dot{x} + (k_m + k_p)x = P + P_1 A_p - P_{est} A_m$$

$$m_1 \ddot{y}_1 + \beta_1 \dot{y}_1 + k_1 y_1 = P_1 A_1 - P_{est} A_1$$

$$V_1 = V_{10} + A_m x + A_1 y_1$$

$$\frac{dV_1}{dt} = A_m \dot{x} + A_1 \dot{y}_1$$

$$\frac{dP_1}{dt} = \frac{\beta_{oi}}{V_1}\left(-\frac{dV_1}{dt}\right)$$

where F is the force generated by the transducer, x is the displacement of the movable element 30, y1 is the displacement of the movable piston 45, P1 is the pressure of the second chamber 24, Pest is the external pressure, Ap is the area of the cross section of the movable element 30, A1 is the area of the cross section of the movable piston 45, Am is the area of the cross section of the membrane 26, V1-V10 is the volume variation of the second chamber 24 due to the displacement of the fitting and movable piston βol is the oil compressibility modulus, βm, β1 and βp are the damping coefficients of the membrane 26, of the movable piston 45 and of the movable element 30, respectively, mp and m1 are the masses of the movable element 30 and of the movable piston 45, respectively, km, kp and k1 are the stiffnesses of the membrane 26, the movable element 30 and the movable piston 45, respectively.

By way of example, in order to work at a temperature of 200° C. and a pressure of 700 bar, the following configuration has been identified:

membrane diameter 26=9.6 mm;
diameter of the second chamber 24=8 mm;
length of the second chamber 24=25.5 mm;
section of the movable piston 45=6 mm;
mass of the movable piston 45=0.9 g;
oil elasticity modulus 1<β<2.5 GPa.

Furthermore, again by way of example, in order to maximize the transmitted power and sensitivity of the electro-acoustic transducer 10 in the 500-3000 Hz band, the equivalent stiffnesses of the pairs of disc springs must be:

3.5 kN/mm for an electro-acoustic transducer intended to be used as a transmitter;
0.4 kN/mm for an electro-acoustic transducer intended for use as a receiver.

An electro-acoustic transducer 10 intended to be used as a transmitter is designed to operate for example in a steady state in the bands specified above, guaranteeing an acoustic power of approximately effective 20 mW.

An electro-acoustic transducer 10 intended to be used as a receiver is preferably designed to guarantee a transduction sensitivity of 20 Vs/m.

The bidirectional data transmission system 100 according to the present disclosure will be described below.

This bidirectional data transmission system is particularly usable in a well for the extraction of formation fluids, for example an oil well.

Furthermore, the bidirectional data transmission system can be used both in the drilling phase and in the production phase; therefore, the bidirectional data transmission system can be associated both with a drilling rig 100 and with a completion rig.

Figure 3:
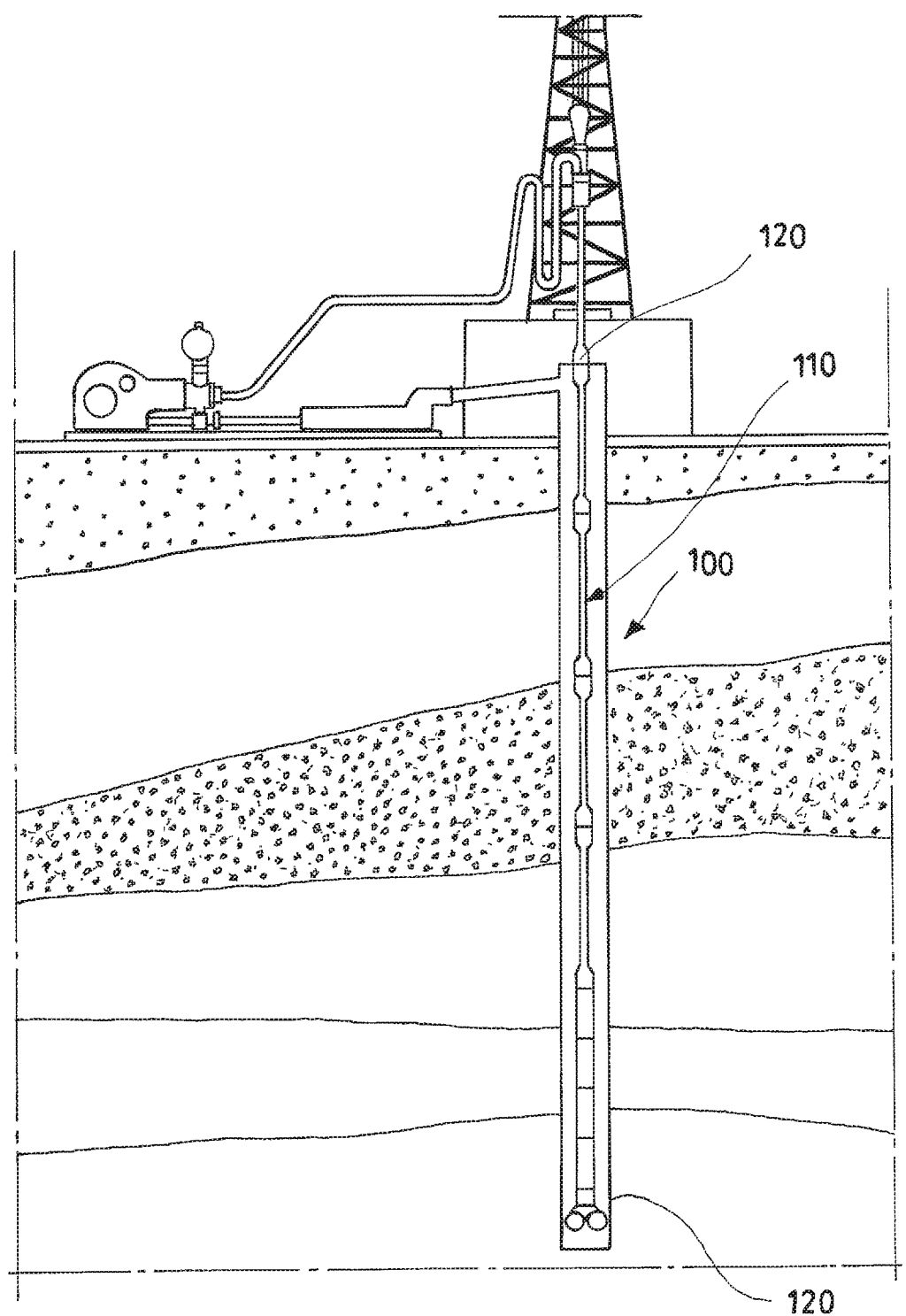
FIG. 3 is a schematic view of a drilling rig for the extraction of hydrocarbons comprising a bidirectional data transmission system according to the present disclosure.

For simplicity of discussion, reference will be made below to the application of the bidirectional data transmission system to a drilling rig 100 such as that illustrated in FIG. 3. Said drilling rig 100 comprises a drilling string 110 comprising in turn a plurality of drilling pipes 111 connected in succession to each other so as to form a drillstring of drillpipes and an excavation tool connected to the free termination of one of the end drillpipes of the string of drillpipes.

The drillpipes 111 have an internal through-duct 112 to allow the passage of a drilling fluid towards the bottom hole. This drilling fluid, as is known, goes up through the interspace between the string of drillpipes and the borehole walls, that is, through the so-called "annulus".

In the case in which the borehole walls are covered by a casing, the annulus corresponds to the interspace between the string of drillpipes and the walls of the casing covering the borehole walls.

In the case of a completion assembly, it comprises a completion tubing formed by pipes adapted to transport the formation fluid, for example oil, towards the surface.

In any case, the bidirectional data transmission system comprises a plurality of communication modules 120 arranged along the drilling or completion string and configured to transmit and/or receive information or command signals to and from the bottom hole.

Hereinafter in the present discussion, the considerations made for the drillpipes 111 can be similarly applied to the completion tubing.

Each of these communication modules 120 comprises:
at least one electro-acoustic transducer 10;
a processing and control unit 50, for example comprising a microprocessor, associated with the at least one electro-acoustic transducer 10, configured to process signals to be transmitted and/or received by the at least one electro-acoustic transducer 10;
a source of electric power supply 60, 70 electrically connected to the at least one electro-acoustic transducer 10 and to the processing and control unit 50.

The communication modules 120, therefore, may comprise a single electro-acoustic transducer 10 configured as a transmitter, or a single electro-acoustic transducer 10 configured as a receiver, or a single electro-acoustic transducer 10 configured as a transceiver, or a pair of electro-acoustic transducers, one configured as a transmitter and the other as a receiver.

In any case, the at least one electro-acoustic transducer 10 of each communication module 120 is connected to the walls of a drillpipe or a completion tubing internally or externally but in any case in contact with the drilling fluid.

The processing and control unit 50 is contained in a body applied to the drillpipe or to the completion tubing or in a compartment obtained in the drillpipe or tubing.

The source of electric power supply 60, 70 can comprise one or more batteries 60 contained in a body applied to the drillpipe or to the completion tubing or in a compartment obtained in the drillpipe or tubing.

Alternatively, or in addition to the batteries 60, the source of electric power supply 60, 70 can comprise at least one generating device 70 configured to generate electric energy from the flow of the drilling fluid. For example, this generating device 70 can be, for example, a turbine located on the passage of the drilling fluid, configured to collect the energy from the flow of the drilling fluid and generate electrical energy so as to supply the electro-acoustic transducer and/or to charge the batteries 60 in such a way as to guarantee the operation of the electro-acoustic transducer 10 even in the event of temporary interruptions of drilling fluid flow.

In the embodiments illustrated in FIGS. 4a and 5a the drillpipe provided with the communication module 110 has a narrowing of the duct for the drilling fluid.

In the embodiment of FIG. 4a the walls of the drillpipe have, at this narrowing, channels facing the duct in which the generating devices 70 are positioned, in particular some turbines.

In the embodiment of FIG. 5a the generating device 70, in particular a turbine, is positioned in the central duct.

The transmission and reception of signals carried out by means of the electro-acoustic transducers 10 allows covering considerable distances at the frequencies indicated above.

In a particular embodiment, the bidirectional data transmission system comprises two communication modules 120 each comprising a respective pair of electro-acoustic transducers configured as a transmitter and receiver.

In this case, a communication module 120 is arranged at the so-called bottom hole assembly and the other communication module 120 is placed in the proximity of the movement unit of the drillpipess or the so-called top drive.

From the above description the features of the electro-acoustic transducer and of the bidirectional data transmission system of the present disclosure, as well as the advantages thereof, are clear.

Lastly, it is clear that the electro-acoustic transducer and of the bidirectional data transmission system thus conceived are susceptible to numerous modifications and variants, without departing from the scope of the disclosure; moreover, all details can be replaced with technically equivalent elements. In practice, the materials used, as well as the dimensions thereof, can be of any type according to the technical requirements.

The invention claimed is:

1. An electro-acoustic transducer adapted to be in contact with a fluid under pressure comprising:
    a tubular body that extends in length along a longitudinal direction X, said tubular body comprising a first end portion and a second end portion, opposite to each other longitudinally, said tubular body internally having a first chamber, which ends with the first end portion and a second chamber, on one side adjacent to and in fluidic communication with said first chamber and on the other side ending with said second end portion, said first end portion being closed towards an outside by a membrane applied to said tubular body, said second end portion having one or more openings that put it in fluidic communication to an outside of said tubular body, said first chamber containing in its walls a plurality of electrical windings arranged in succession to each other in the longitudinal direction X, said second chamber being filled with a liquid;
    a movable element housed in said first chamber, said movable element comprising a plurality of permanent magnets packaged and arranged one above the other, with magnetization alternating in the longitudinal direction X and separated from one another by discs of ferromagnetic material, said movable element being supported at longitudinal ends by springs, said movable element being also connected to said membrane; and
    a movable piston positioned and slidable in the second end portion.

2. The electro-acoustic transducer according to claim 1, wherein said electrical windings are made by a plurality of metallic rings separated by an insulating layer.

3. The electro-acoustic transducer according to claim 1, wherein said movable element is connected to said membrane by an extension element coupled on one side to an end of the movable element and on the other side, to the membrane.

4. The electro-acoustic transducer according to claim 1, wherein said springs are a pair of preloaded disc springs.

5. The electro-acoustic transducer according to claim 1, wherein said second end portion is coupled to a bushing that extends toward an interior of the second chamber for a section of its length such that it restricts an inner passage, said movable piston being positioned in the narrow inner passage.

6. The electro-acoustic transducer according to claim 1, wherein said movable piston and said second chamber are sized to allow pressure compensation when acoustic signals are transmitted or received in a 450-5000 Hz frequency range.

7. A bidirectional data transmission system adapted to be installed in a drilling string or completion assembly of a well for extraction of formation fluids comprising:
    a plurality of communication modules arranged along a drilling or completion string, and configured to transmit and/or receive information or control signals to and from a well bottom, each of said communication modules comprising:
        at least one electro-acoustic transducer according to claim 1, said at least one electro-acoustic transducer being connected to walls of a drillpipe or of a completion tubing internally or externally but still in contact with a drilling fluid;
        a processing and control unit associated with said at least one electro-acoustic transducer, configured to process signals to be transmitted and/or received by said at least one electro-acoustic transducer; and
        a source of electric power supply electrically connected to said at least one electro-acoustic transducer and to said processing and control unit.

8. The bidirectional data transmission system according to claim 7, wherein said source of electric power supply comprises one or more batteries.

9. The bidirectional data transmission system according to claim 7, said source of electric power supply comprises at least one generating device configured to generate electric energy from a flow of the drilling fluid.

\* \* \* \* \*